(12) United States Patent
Seo et al.

(10) Patent No.: US 10,312,488 B2
(45) Date of Patent: Jun. 4, 2019

(54) CARTRIDGE FOR SECONDARY BATTERY

(71) Applicant: LG CHEM, LTD., Seoul (KR)

(72) Inventors: Jae-Hyun Seo, Daejeon (KR); Nam-In Kim, Daejeon (KR); Young-Sop Eom, Daejeon (KR); Bo-Hyon Kim, Daejeon (KR); Hyun-Young Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 27 days.

(21) Appl. No.: 15/554,547

(22) PCT Filed: Aug. 12, 2016

(86) PCT No.: PCT/KR2016/008938
§ 371 (c)(1),
(2) Date: Aug. 30, 2017

(87) PCT Pub. No.: WO2017/039181
PCT Pub. Date: Mar. 9, 2017

(65) Prior Publication Data
US 2018/0053920 A1      Feb. 22, 2018

(30) Foreign Application Priority Data

Sep. 2, 2015   (KR) .................... 10-2015-0124323

(51) Int. Cl.
*H01M 2/10*   (2006.01)
*H01M 10/48*   (2006.01)
(Continued)

(52) U.S. Cl.
CPC ........... *H01M 2/1077* (2013.01); *H01M 2/10* (2013.01); *H01M 2/1005* (2013.01);
(Continued)

(58) Field of Classification Search
CPC ............ H01M 2/1077; H01M 10/486; H01M 10/625; H01M 10/613
See application file for complete search history.

(56) References Cited

U.S. PATENT DOCUMENTS

2006/0234119 A1* 10/2006 Kruger ................ H01M 2/1061
429/160
2010/0266883 A1* 10/2010 Koetting ............ H01M 2/1077
429/96
(Continued)

FOREIGN PATENT DOCUMENTS

KR    10-2013-0022504 A    3/2013
KR    10-2014-0042059 A    4/2014
(Continued)

OTHER PUBLICATIONS

International Search Report for PCT/KR2016/008938 (PCT/ISA/210) dated Nov. 22, 2016.

*Primary Examiner* — Matthew J Merkling
(74) *Attorney, Agent, or Firm* — Birch, Stewart, Kolasch & Birch, LLP

(57) ABSTRACT

A cartridge for a secondary battery, according to an aspect of the present disclosure, includes a lower cartridge and an upper cartridge capable of being assembled with each other with at least one secondary battery therebetween. The lower cartridge includes a cell guide unit having two inner wall surfaces that protrude upward in at least one corner area of the lower cartridge from other areas and are adjacent to each other at right angles to each other, and the upper cartridge includes a cell guide assembly unit having a shape lit for the cell guide unit.

14 Claims, 7 Drawing Sheets

(51) Int. Cl.
*H01M 10/613* (2014.01)
*H01M 10/625* (2014.01)
*H01M 10/6554* (2014.01)

(52) U.S. Cl.
CPC ......... *H01M 10/48* (2013.01); *H01M 10/482* (2013.01); *H01M 10/486* (2013.01); *H01M 10/613* (2015.04); *H01M 10/625* (2015.04); *H01M 10/6554* (2015.04); *H01M 2220/20* (2013.01)

(56) References Cited

U.S. PATENT DOCUMENTS

| | | | |
|---|---|---|---|
| 2011/0256446 A1* | 10/2011 | Bronczyk | H01M 2/1077 429/163 |
| 2012/0040221 A1* | 2/2012 | Stoughton | H01M 2/1061 429/120 |
| 2013/0052496 A1 | 2/2013 | Han | |
| 2016/0036017 A1 | 2/2016 | Seong et al. | |

FOREIGN PATENT DOCUMENTS

| | | |
|---|---|---|
| KR | 10-1416544 B1 | 7/2014 |
| KR | 10-2014-0144787 A | 12/2014 |
| KR | 10-2015-0047030 A | 5/2015 |

* cited by examiner

CARTRIDGE FOR SECONDARY BATTERY

TECHNICAL FIELD

The present disclosure relates to a cartridge for a second battery, and more particularly, to a cartridge for a second battery, which is used to accommodate or stack a plurality of second batteries.

The present application claims priority to Korean Patent Application No. 10-2015-0124323 filed on Sep. 2, 2015 in the Republic of Korea, the disclosure of which is incorporated herein by reference.

BACKGROUND ART

Nickel-cadmium batteries, nickel-hydrogen batteries, nickel-zinc batteries, and lithium secondary batteries are commercially available secondary batteries. Among them, the lithium secondary batteries have almost no memory effect compared to nickel-based secondary batteries, and are capable of being freely charged and discharged. Also, the lithium secondary batteries have very low self-discharge rates and high energy densities, so that the lithium secondary batteries have attracted much attention.

A lithium secondary battery mainly uses a lithium-based oxide and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator therebetween, and an external member (i.e., a battery case) configured to hermetically store the electrode assembly along with an electrolyte solution.

In general, lithium secondary batteries may be classified into a can-type secondary battery in which an electrode assembly is embedded in a metal can and a pouch-type secondary battery in which an electrode assembly is embedded in a pouch of an aluminum laminate sheet, depending on a shape of an external member.

Recently, secondary batteries have been widely used not only in small-sized devices, such as portable electronic devices, but also in middle- or large-sized devices, such as automobiles or electric power storage devices. When used in middle- or large-sized devices, a large number of secondary batteries are electrically connected to increase capacity and output. In particular, pouch-type secondary batteries are frequently used for the middle- or large-sized devices because the pouch-type secondary batteries are easy to stack.

However, since a pouch-type secondary battery is generally packed in a battery case of a laminate sheet including aluminum and polymer resin, the pouch-type secondary battery does not have high mechanical rigidity. Accordingly, when a battery module is configured with a plurality of pouch-type secondary batteries, a cartridge is often used to protect the secondary batteries from external impact, prevent motion of the secondary batteries, and facilitate the stacking of the secondary batteries. The term "cartridge" may be replaced by various other terms, such as a cell cover.

One cell cartridge assembly is provided by accommodating approximately two secondary batteries per cartridge, and one battery module may be configured by assembling a plurality of cell cartridge assemblies. Here, the cell cartridge assemblies, each of which is a basic unit of the battery module, occupy the largest quantity among components of the battery module. Accordingly, it takes the most time to prepare the cell cartridge assemblies during a process of producing the battery module.

Meanwhile, the assembly of a conventional cell cartridge assembly may include stacking two secondary batteries on a top surface of a lower cartridge, and then covering the stacked secondary batteries with an upper cartridge. However, in this case, it is not easy to quickly and accurately stack unit secondary battery cells on the lower cartridge every time. Thus, there is a problem that the time required to assemble one cell cartridge assembly increases. Furthermore, an assembly tolerance is highly likely to occur depending on a degree of skill of an operator. The assembly tolerance may be a factor that adversely affects performance of the battery module.

DISCLOSURE

Technical Problem

The present disclosure is designed to solve the problems of the related art, and therefore the present disclosure is directed to providing a cartridge for a secondary battery, by which at least two secondary batteries may be easily mounted in a cartridge and also, placed in correct assembly positions when the secondary batteries and the cartridge are assembled.

Technical Solution

In one aspect of the present disclosure, there is provided a cartridge for a secondary battery, including a lower cartridge and an upper cartridge capable of being assembled with each other with at least one secondary battery therebetween. The lower cartridge includes a cell guide unit having two inner wall surfaces that protrude upward in at least one corner area of the lower cartridge from other areas and are adjacent to each other at right angles to each other, and the upper cartridge includes a cell guide assembly unit having a shape fit for the cell guide unit.

The cell guide unit may include a step from outside to inside of the cell guide unit such that an upper end part of the cell guide unit may be thinner than a lower end part of the cell guide unit.

The lower end part of the cell guide unit may have a shape fit for the cell guide assembly unit in a vertical direction, and the upper end part of the cell guide unit may be located inside the cell guide assembly unit.

Each of the lower cartridge and the upper cartridge may have a rectangular shape, and one cell guide unit may be provided in each of four corner areas of the lower cartridge.

The lower cartridge may include a lower cooling plate provided in the form of a thermal conductive plate, a first lower frame provided in the form of a rectangular ring having an empty central part and coupled to the lower cooling plate to cover the central part of the first lower frame, and a second lower frame forming a wall body on a long side of the first lower frame. The cell guide unit may be provided at each of both end parts of the second lower frame.

The upper cartridge may include an upper cooling plate provided in the form of a thermal conductive plate, a first upper frame provided in the form of a rectangular ring having an empty central part and coupled to the upper cooling plate to cover the central part of the first upper frame, and a second upper frame forming a wall body on a long side of the first upper frame. The second lower frame may be formed to have a greater height than the second upper frame.

At least one hook may be provided in a side part of the second upper frame, and at least one hook catch hole may be provided in a side part of the second lower frame to correspond to the at least one hook of the second upper frame.

The lower cooling plate may be thermally fused and bonded to an outer surface of the first lower frame, and the upper cooling plate may be thermally fused and bonded to an outer surface of the first upper frame.

At least one of the lower cooling plate and the upper cooling plate may include a temperature-measuring tab protruding from at least one side thereof in a lengthwise direction.

In another aspect of the present disclosure, there is also provided a battery module including the above-described cartridge for the secondary battery.

In another aspect of the present disclosure, there is also provided a vehicle including the battery module.

Advantageous Effects

According to an aspect of the present disclosure, secondary batteries can be easily stacked on a cartridge, thereby reducing a tact time of a process of assembling the secondary batteries and the cartridge. As a result, productivity of a battery module can be further improved.

According to another aspect of the present disclosure, a plurality of secondary batteries can be neatly stacked in respective precise assembly positions on a lower cartridge, thereby markedly reducing an assembly tolerance.

MODE FOR DISCLOSURE

Figure 1:
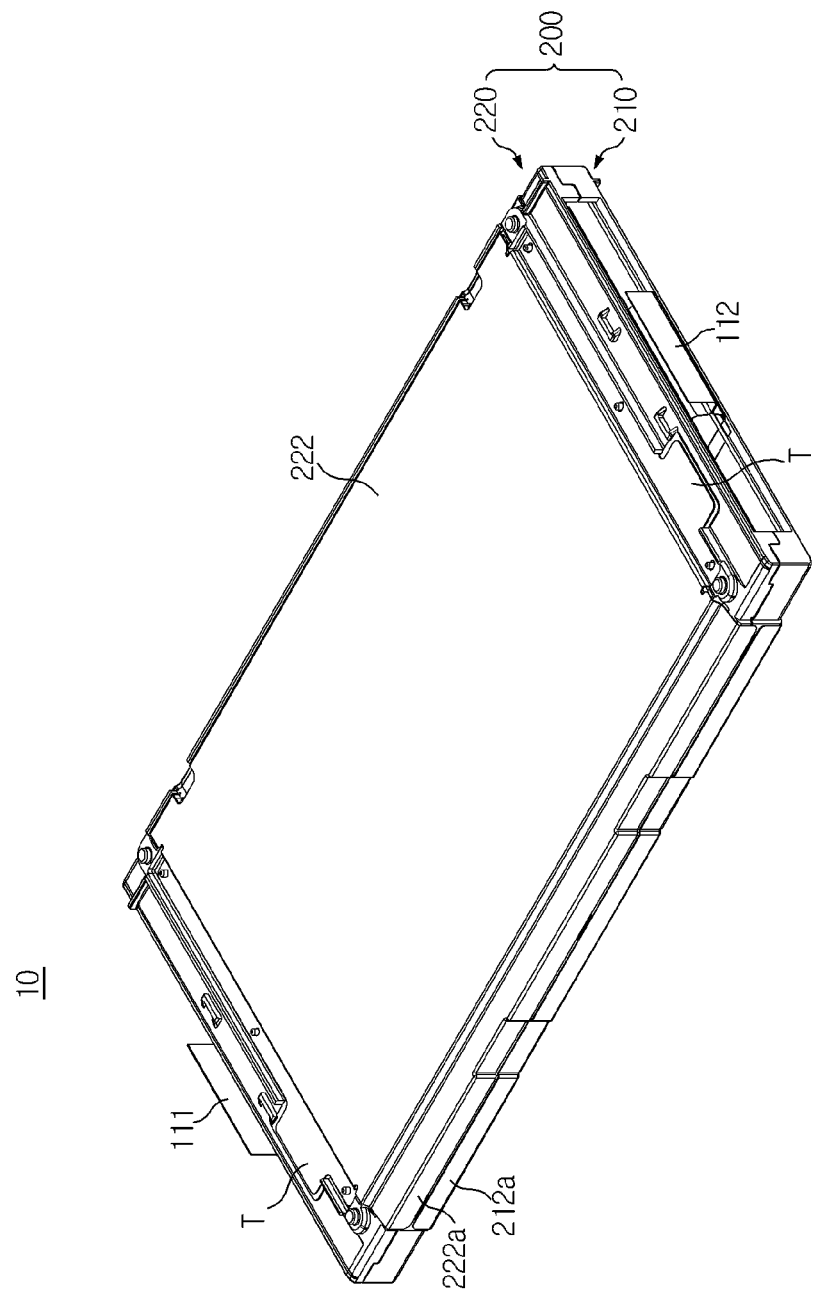
FIG. 1 is a perspective view of a cell cartridge assembly according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Specific descriptions of well-known components and functions may be omitted so as to unnecessary obscure embodiments of the present disclosure.

The embodiments of the present disclosure are provided to fully convey the concept of the present disclosure to one skilled in the art, so that shapes and sizes of components in the drawings may be exaggerated, omitted, or schematically illustrated for clarity. Thus, a size or ratio of each component does not totally reflect an actual size or ratio.

Figure 2:
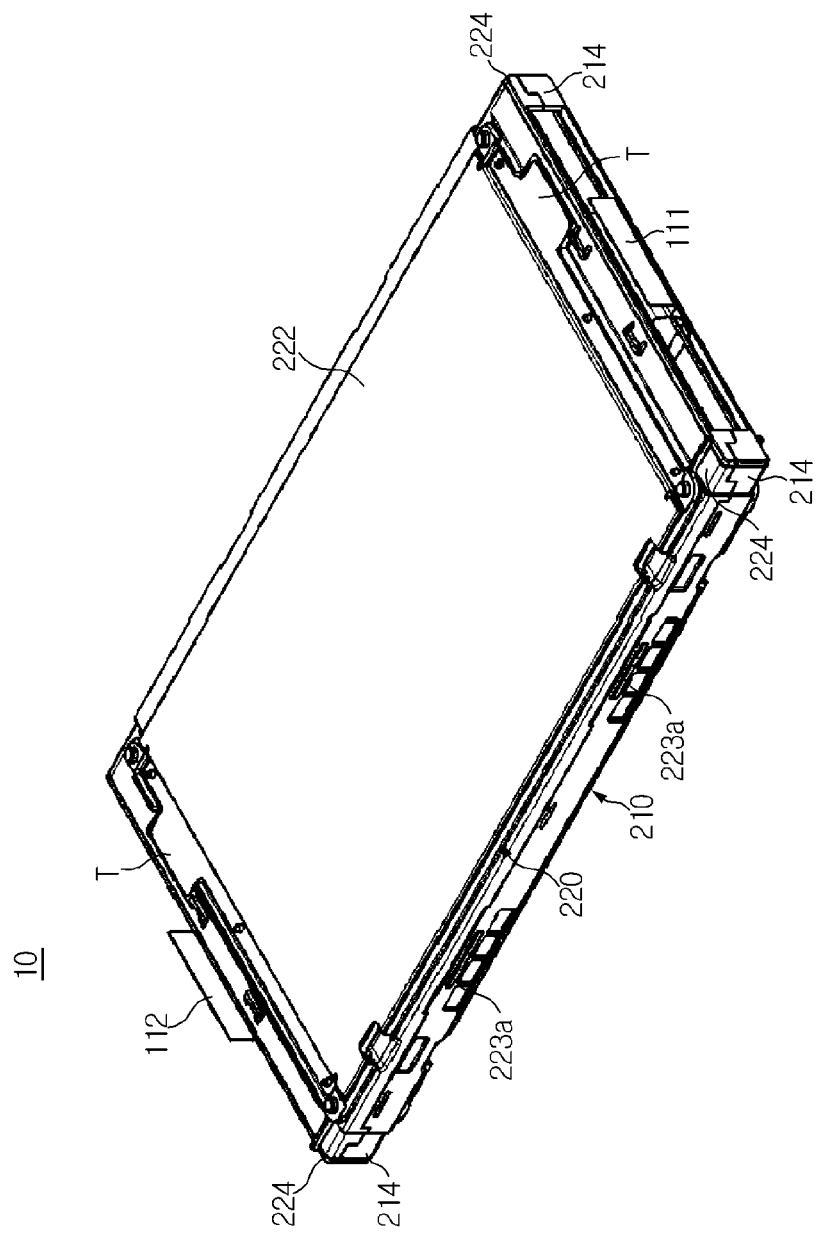
FIG. 2 is a perspective view of the cell cartridge assembly of FIG. 1, which is viewed from a different angle.
Figure 3:
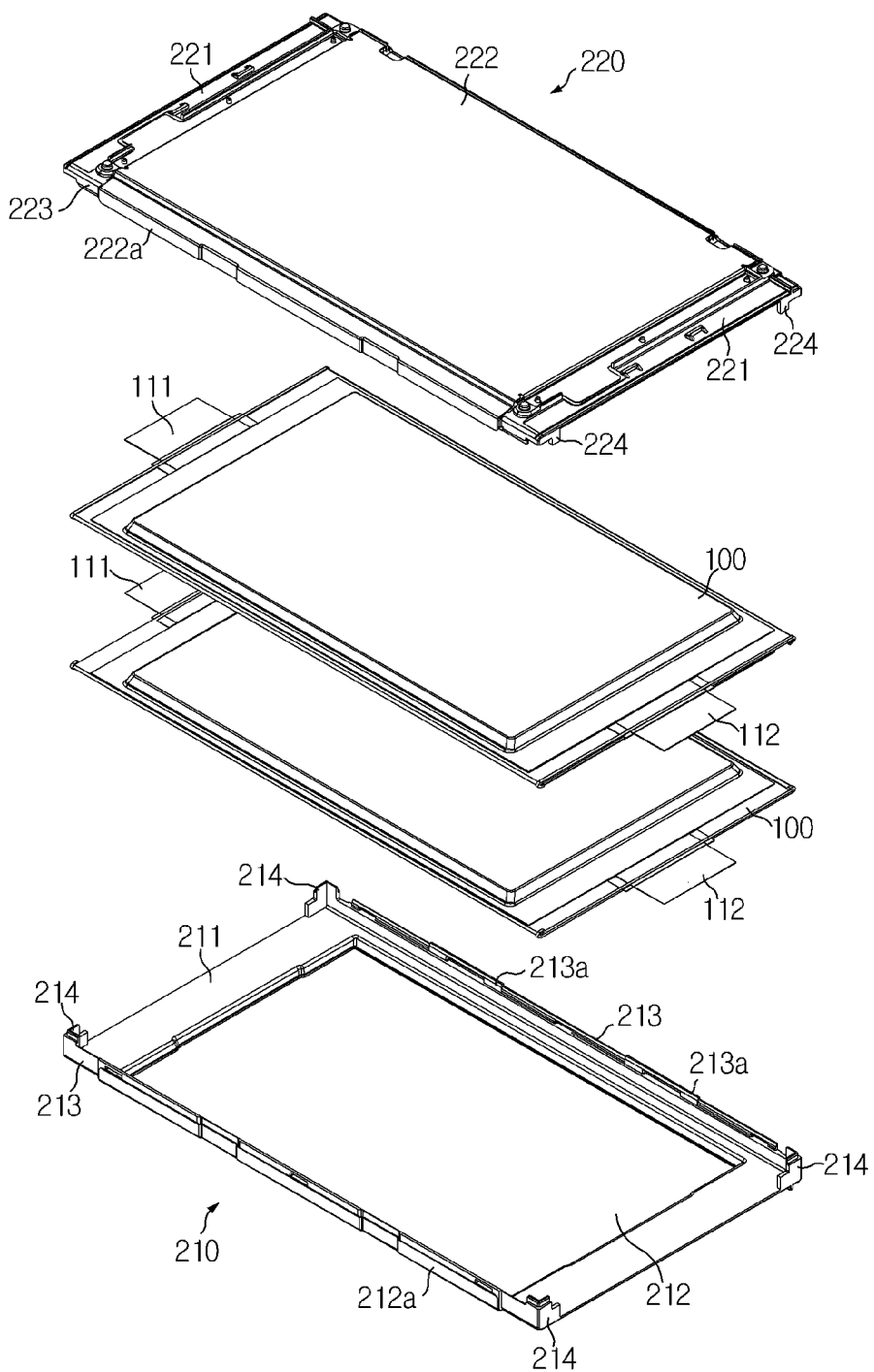
FIGS. 3 and 4 are diagrams of states before assembling a cell cartridge assembly according to an embodiment of the present disclosure.
Figure 4:
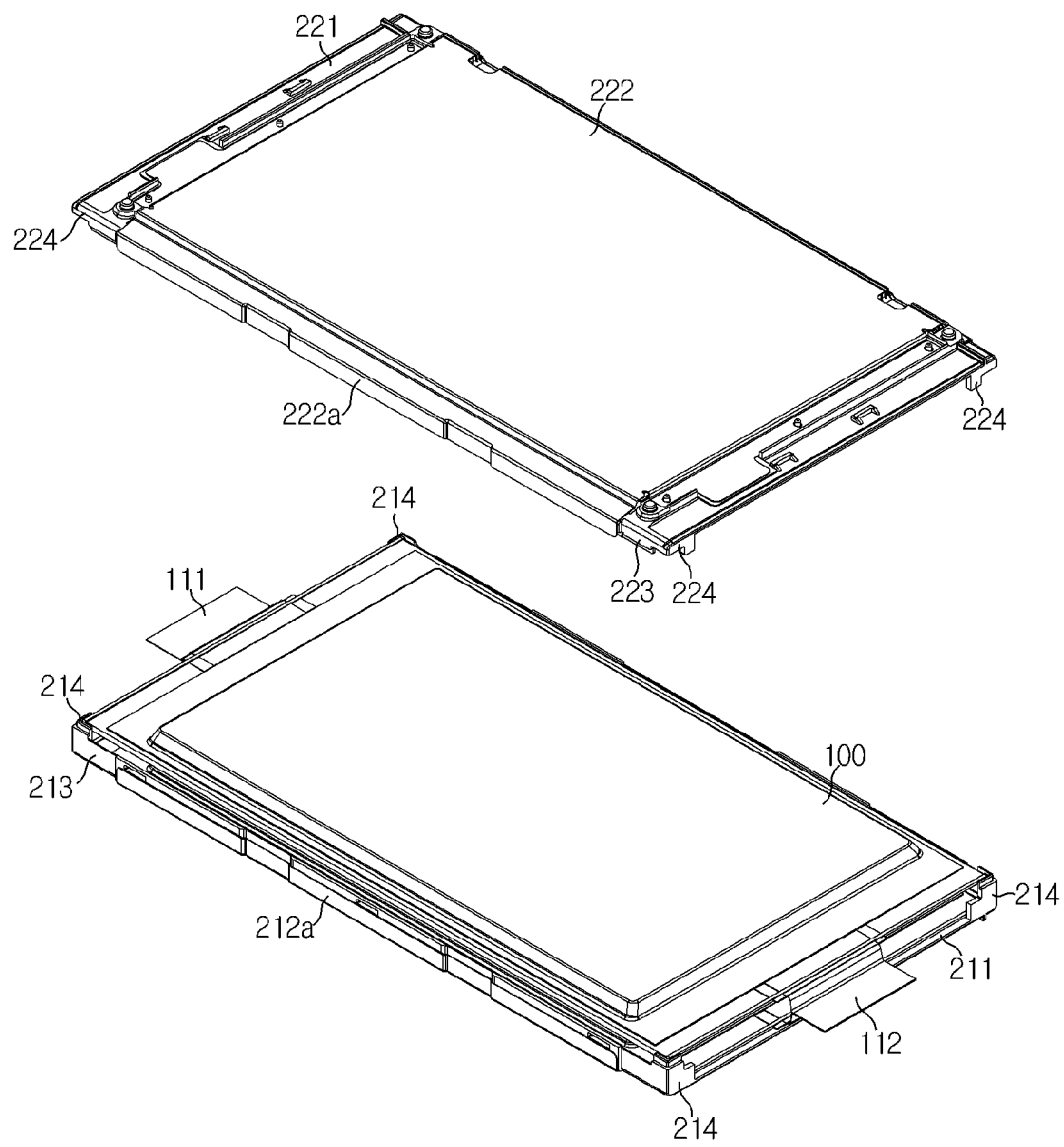

FIG. 1 is a perspective view of a cell cartridge assembly according to an embodiment of the present disclosure. FIG. 2 is a perspective view of the cell cartridge assembly of FIG. 1, which is viewed from a different angle. FIGS. 3 and 4 are diagrams of states before assembling a cell cartridge assembly according to an embodiment of the present disclosure.

Referring to FIGS. 1 to 4, a cell cartridge assembly 10 according to an embodiment of the present disclosure includes a plurality of secondary batteries 100 and a cartridge 200 for a secondary battery.

The secondary batteries 100 may be pouch-type secondary batteries 100 so as to provide a high stacking rate in a limited space.

Each of the pouch-type secondary batteries 100 includes an electrode assembly including a positive electrode plate, a separator, and a negative electrode plate. A positive electrode lead 111 and a negative electrode lead 112 may be electrically connected to a plurality of positive electrode tabs and a plurality of negative electrode tabs, which protrude from the positive electrode plate and the negative electrode plate, respectively. Each of the pouch-type secondary batteries 100 may have a structure in which, with the electrode assembly embedded in a battery case of a laminate sheet including a resin layer and a metal layer, an edge part of the battery case is thermally fused and sealed.

The pouch-type secondary batteries 100 may be stacked in a vertical direction and accommodated in the cartridge 200 for the secondary battery. In this case, the electrode leads 111 and 112 may be exposed to the outside through an opening of the cartridge 200 for the secondary battery.

The cartridge 200 for the secondary battery (hereinafter, referred to as a "cartridge") is a component used to stack the secondary batteries 100. Cartridges 200 are configured to hold the secondary batteries 100, prevent motion of the secondary batteries 100, and be capable of being stacked and serve so as to guide the assembly of the secondary batteries 100.

Referring to FIGS. 3 and 4, the cartridge 200 according to the embodiment of the present disclosure includes a lower cartridge 210 and an upper cartridge 220, which may be assembled to each other with the secondary battery 100 therebetween. In the present embodiment, each of the lower cartridge 210 and the upper cartridge 220 may have a rectangular shape, which corresponds to the pouch-type secondary battery 100 having a rectangular shape. However, the scope of right of the present disclosure is not necessarily limited to cartridges having a rectangular shape.

The lower cartridge 210 includes a first lower frame 211, a second lower frame 213, and a lower cooling plate 212. Also, the upper cartridge 220 includes a first upper frame 221, a second upper frame 223, and an upper cooling plate 222. Here, the first lower frame 211 and the first upper frame 221 have almost similar structures corresponding to each other, and the lower cooling plate 212 and the upper cooling plate 222 have almost similar structures corresponding to each other, and thus a description of one of the similar structures will be omitted by presenting a description of the other of the similar structures.

For reference, in the present specification, direction-indicating terms, such as "lower", "upper", and "one side surface", may be used herein for ease of description to describe the present disclosure, and be used interchangeably depending on a position of an object or an observer's position.

First, the first lower frame 211, which corresponds to a frame of the lower cartridge 210, may be provided in the form of a rectangular ring having an empty central part.

The center part may correspond to a size of the electrode assembly embedded in the battery case. For example, when the secondary battery 100 is stacked on the first lower frame 211, the electrode assembly may be located at the central part. As described above, when the electrode assembly is partially mounted in the central part of the first lower frame 211, the motion of the secondary battery 100 may be inhibited. In addition, the central part of the first lower frame 211 may be a basis for determining an assembling position of the secondary battery 100.

The central part of the first lower frame 211 may be covered by the lower cooling plate 212. More specifically, the lower cooling plate 212 is coupled to an outer side surface of the first lower frame 211 (i.e., an outer edge of the first lower frame 211), and covers the central part of the first lower frame 211. The lower cooling plate 212 may have such a size as to cover at least the central part of the first lower frame 211. The lower cooling plate 212 may be a thermally conductive metal plate.

The lower cooling plate 212 according to the present embodiment may be coupled to an outer surface of the first lower frame 211 by using a thermal fusion bonding method. For example, the outer surface of the first lower frame 211 is embossed to form a protrusion line (not shown), the lower cooling plate 212 is located on the protrusion line, and then heat and pressure are applied to melt the protrusion line, so that the lower cooling plate 212 and the first lower frame 211 may be fused and bonded to each other.

According to the thermal fusion bonding method, since there is no gap between the lower cooling plate 212 and the first lower frame 211, sealing performance and bonding force of the cartridge 200 may improve. Naturally, an insert injection method or a bolting method may be applied to a process of coupling the lower cooling plate 212 to the first lower frame 211.

The lower and upper cooling plates 212 and 222 may be selected from sheet-type plates including a metal material, which have a thickness of about 0.1 mm to about 5.0 mm and predetermined mechanical rigidity. However, thicknesses or structures of the lower and upper cooling plates 212 and 222 are not particularly limited as long as the lower and upper cooling plates 212 and 222 are thin members having thermal conductivity. The metal material may be, but not limited to, aluminum or an aluminum alloy having high thermal conductivity and light weight. The lower and upper cooling plates 212 and 222 reinforce poor mechanical rigidity of the battery case.

The lower and upper cooling plates 212 and 222, which are thermally conductive metal plates, are in contact with one surface of the secondary battery 100, and at least parts of the lower and upper cooling plates 212 and 222 are in contact with a cooling member 20 of a battery module and may serve to discharge heat of the secondary battery 100 to the outside.

For example, as shown in FIGS. 1, 3, and 4, an edge part 212a of the lower cooling plate 212 may be bent so as to further surround one side surface of the lower cartridge 210. An edge part 222a of the upper cooling plate 222 may also be bent so as to further surround the one side surface of the upper cartridge 220 in the same manner as the lower cooling plate 212. Thus, the one side surface of the cartridge 200 may be enclosed by the bent edge parts 212a and 222a of the lower and upper cooling plates 212 and 222.

Figure 5:
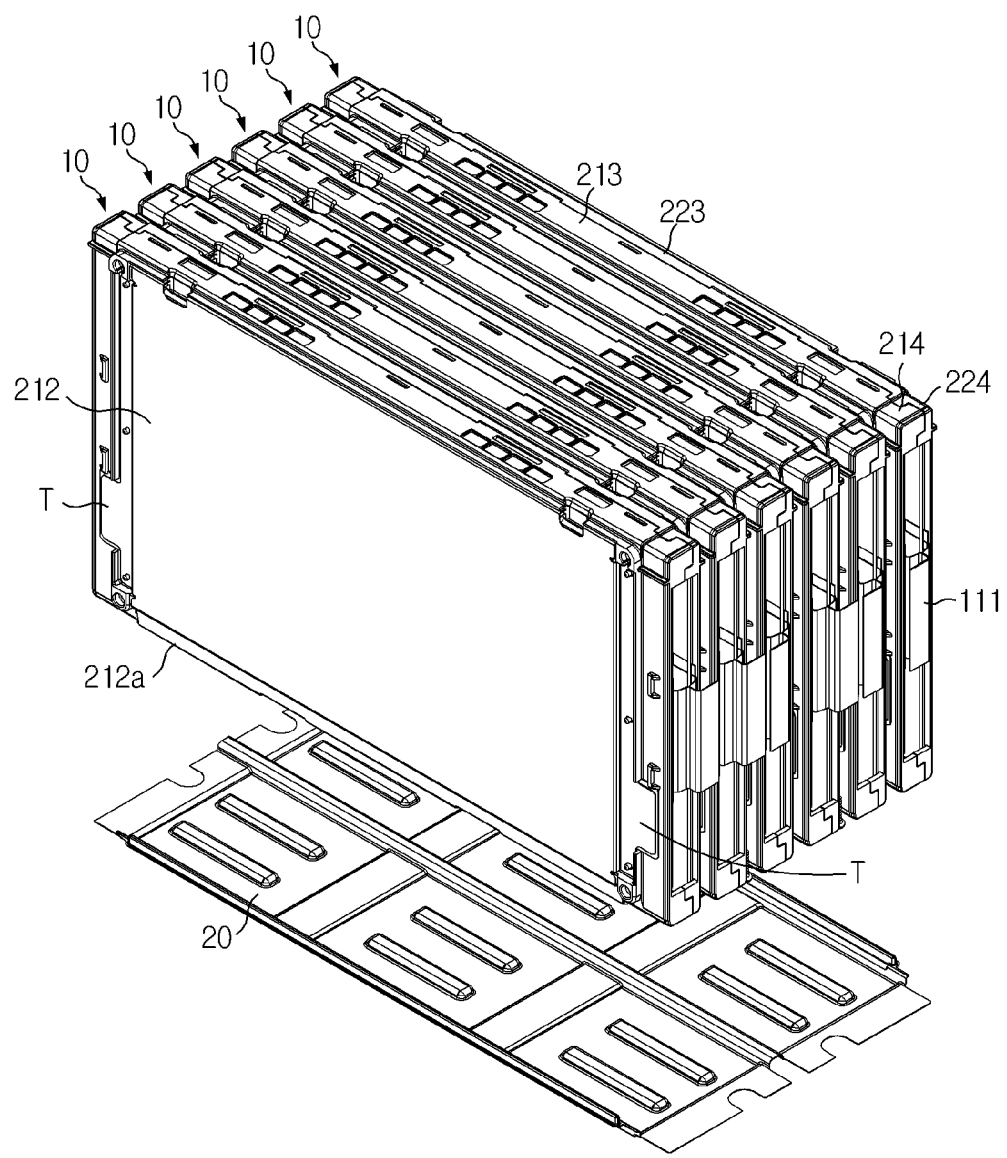
FIG. 5 is a schematic perspective view of some components of a battery module including a cell cartridge assembly according to an embodiment of the present disclosure.

A stack structure of cartridges 200 of FIG. 5 may include a plurality of cartridges 200 that are stacked. The stack structure of the cartridges 200 are disposed on the cooling member 200 so that the bent edge parts 212a and 222a of the lower and upper cooling plates 212 and 222 may face downward. Due to this configuration, heat generated in the secondary battery 100 may be transmitted to the cooling member 20 through the lower and upper cooling plates 212 and 222. The cooling member 20 may discharge heat to the outside of the battery module or be cooled by an additional cooling device, such as a heat sink.

As shown in FIG. 5, the other side surface of the cartridge 200 may be left uncovered by the lower and upper cooling plates 212 and 222. For example, the other side surface of the cartridge 200 may be used as a place where ventilation holes and connection units configured to mount accessory devices of the battery module are provided.

Particularly, at least one of the lower and upper cooling plates 212 and 222 according to an embodiment of the present disclosure may further include temperature-measuring tabs T, which protrude in a lengthwise direction, namely, a direction in which the electrode leads 111 and 112 are exposed in the cartridge 200. For example, as shown in FIGS. 1 and 2, parts of corners of the lower and upper cooling plate 212 and 222 may further extend close to corners of short sides of the first upper frame 221 and the first lower frame 211. Thus, the extended parts of the corners of the lower and upper cooling plates 212 and 222 may serve as the temperature-measuring tabs T and be contact with a thermistor (not shown) after the battery module is assembled.

For example, the thermistor (not shown) is inserted into the battery module from the outside of the battery module through a through hole and contacts the temperature-measuring tab T to measure a temperature of the cell cartridge assembly 10. Here, the thermistor may be a semiconductor device using a phenomenon that a resistance value varies with temperature.

A width of both opposite short sides of the first lower frame 211 may be formed to be larger than a width of both opposite long sides of the first lower frame 211.

A dead space may be reduced by reducing the width of the long sides of the first lower frame 211, and rigidity may be increased by relatively increasing the width of the short sides of the first lower frame 211.

As shown in FIGS. 3 and 4, the second lower frame 213 is bent upward on the both opposite long sides of the first lower frame 211 and forms a wall body. Also, the second upper frame 223 is bent downward on both opposite long sides of the first upper frame 221 and forms a wall body. Although the second lower frame 213 is conceptually divided form the first lower frame 211, the second lower frame 213 may be integrally formed with the first lower frame 211. Similarly, the second upper frame 223 may also be integrally formed with the first upper frame 221.

Referring to FIGS. 2 and 3, the second lower frame 213 and the second upper frame 223 may be hook-coupled to each other so that the lower cartridge 210 and the upper cartridge 220 may be assembled into one body.

The upper cartridge 220 may include at least one hook 223a in a side part of the second upper frame 223, and the lower cartridge 210 may include at least one hook catch hole 213a in a side part of the second lower frame 213.

Figure 6:
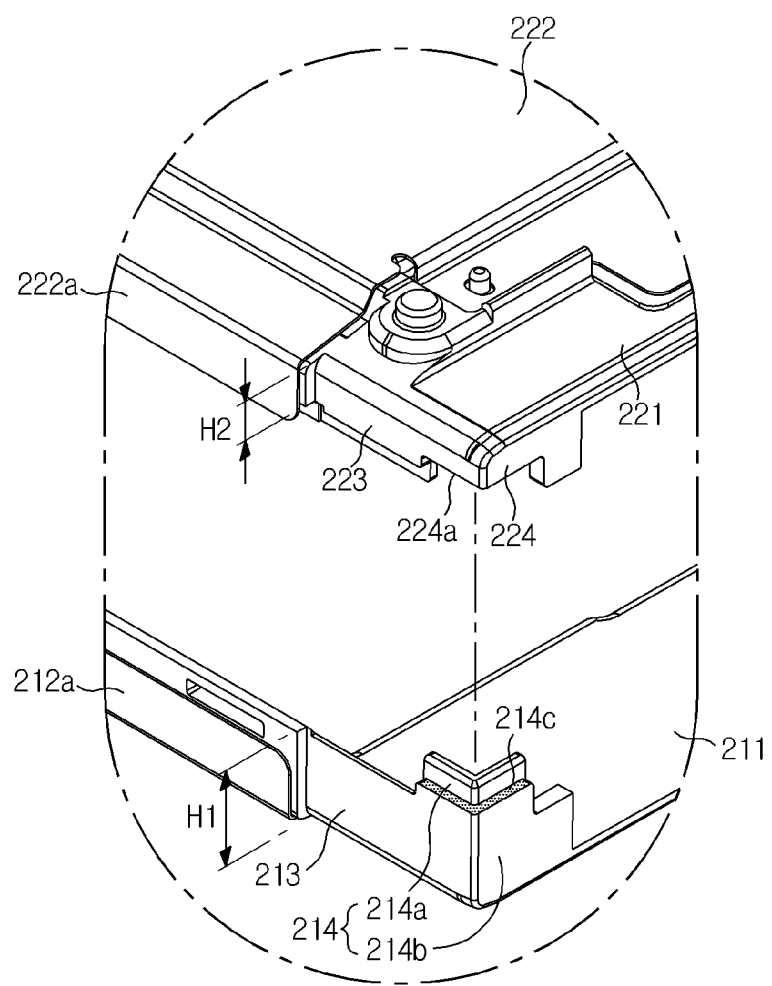
FIG. 6 is a partial enlarged perspective view of corner areas of a lower cartridge and an upper cartridge according to an embodiment of the present disclosure.

A size of an inner space of the cartridge 100 may be determined by a height H1 of the second lower frame 213 and a height H2 of the second upper frame 223. In the cartridge 100 according to the present embodiment, as shown in FIGS. 2 and 6, the height H1 of the second lower frame 213 is greater than the height H2 of the second upper frame 223.

By forming the second lower frame 213 to the height H1 greater than the height H2 of the second upper frame 223, when a plurality of second batteries 100 are stacked on the lower cartridge 210, both side parts of the battery case may be supported by the second lower frame 213 so that the secondary batteries 100 may be stably stacked.

The lower cartridge 210 of the present disclosure further includes a cell guide unit 214. The cell guide unit 214 is configured to guide the secondary batteries 100 so that the secondary batteries 100 may be easily stacked.

The cell guide unit 214 has two inner wall surfaces, which are provided in at least one corner area of the lower cartridge 210, protrude upward from other areas, and are adjacent to each other at right angles to each other. For example, as shown in FIGS. 3 and 4, one cell guide unit 214 according to the present embodiment may be provided at each of both end parts of the second lower frame 213. In other words, one cell guide unit 214 may be provided at each of four corner areas of the lower cartridge 210.

An upper end part of the cell guide unit 214 protrudes upward from upper end parts of other areas. More specifically, the upper end part of the cell guide unit 214 is located at least at a higher level than a height of an outer terrace unit, which is a sealing unit of the secondary battery 100 stacked at an uppermost end on the lower cartridge 210.

The four cell guide units 214 of the lower cartridge 210 may respectively correspond to four corners of the outer terrace unit of the second battery 100. Accordingly, when the secondary battery 100 is to be stacked on the lower cartridge 210, an operator may align the corners of the outer terrace unit of the secondary battery 100 with the four cell guide units 214. Thus, the secondary batteries 100 located on the lower cartridge 210 may be inhibited from moving in left and right directions because the corners of the outer terrace units of the secondary batteries 100 are aligned with right-angled inner wall surfaces of the cell guide units 214. Therefore, since the motion of the second batteries located on the lower cartridge 210 is inhibited, after all the secondary batteries 100 are stacked, the upper cartridge 220 and the lower cartridge 210 may be more easily assembled.

In particular, since the upper end part of the cell guide unit 214 protrudes upward from other areas, at least two secondary batteries 100 may be more stably stacked on the lower cartridge 210.

For example, two secondary batteries 100 may be stacked on the lower cartridge 210 of the present embodiment. To begin with, a first secondary battery 100 is directly placed on a top surface of the lower cartridge 210. In this case, the first secondary battery 100 may be guided by four cell guide units 214 and a convex part of the electrode assembly may be inserted into the above-described central region of the first lower frame 211, so that the first secondary battery 100 may be relatively easily mounted on and fixed to the lower cartridge 210.

However, since a second secondary battery 100 is mounted on the first secondary battery 100, possibility of motion of the second secondary battery 100 increases. That is, it is more difficult to place the second secondary battery 100 in a fixed position than the first secondary battery 100. However, the cell guide unit 214 according to the present disclosure has an asymmetrically higher top end than other areas and an inner wall surface corresponding to a corner area of an outer edge part of the secondary battery 100, so that the stacking of the second secondary battery 100 may be facilitated. That is, even if the second secondary battery 100 is placed on the first secondary battery 100, four corners of the outer terrace unit may be respectively aligned with the inner wall surfaces of the cell guide unit 214. Accordingly, the second secondary battery 100 may be simply and accurately stacked on the first secondary battery 100.

According to the configuration of the cell guide unit 214 of the present embodiment, a process of assembling the cell cartridge assembly 10 may be simplified to increase productivity, and an assembly tolerance may be reduced to improve quality of the battery module.

A cell guide assembly unit 224, which is to be assembled with the cell guide unit 214 of the lower cartridge 210, is provided in a corner area of the upper cartridge 220. The cell guide assembly unit 224 is configured to have a shape fit for the cell guide unit 214. Although not specifically shown, a groove unit into which the upper end part of the cell guide unit 214 is partially inserted may be provided in the cell guide assembly unit 224.

Figure 7:
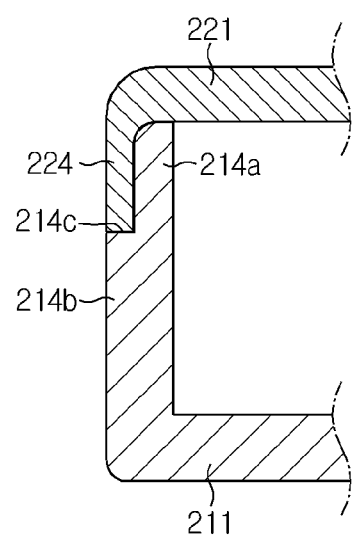
FIG. 7 is a schematic cross-sectional view of a cell guide unit and a cell guide assembly unit, which are assembled with each other, according to an embodiment of the present disclosure.

In particular, the cell guide unit 214 according to the present embodiment includes a step. Specifically, as shown in FIGS. 6 and 7, the step may be formed from the outside toward the inside of the cell guide unit 214 so that an upper end part 214a of the cell guide unit 214 may be thinner than a lower end part 214b thereof.

When the lower cartridge 210 is covered by the upper cartridge 220, the upper end part 214a of the cell guide unit 214, which has a relatively small thickness, is located inside an inner surface of the cell guide assembly unit 224, and the lower end part 214b of the cell guide unit 214, which has a relatively large thickness, has an upper end surface 214c that is vertically in contact with a lower end surface 224a of the cell guide assembly unit 224.

As described above, the four cell guide units 214 provided at the corner areas of the lower cartridge 210 may respectively be configured to have shapes fit for four cell guide assembly units 224 provided at corners of the upper cartridge 220. In this case, since the upper end part 214a of the cell guide unit 214 is located inside an inner wall surface of the cell guide assembly unit 224, motion of the upper end part 214a of the cell guide unit 214 in a horizontal direction may be limited by the inner wall surface of the cell guide assembly unit 224. Accordingly, when the lower cartridge 210 is covered by the upper cartridge 220, relative rotation of the upper cartridge 220 or the lower cartridge 210 may be prevented. Also, the assembly of the lower cartridge 210 and the upper cartridge 220 may be guided by the cell guide unit 214 and the cell guide assembly unit 224.

In addition, as described above, in the cartridge 200 of the present embodiment, horizontal motion or deviation of the upper cartridge 220 with respect to the lower cartridge 210 may be prevented by the cell guide unit 214 of the lower cartridge 210 and the cell guide assembly unit 224 of the upper cartridge 220. Thus, the lower cartridge 210 may be more easily hook-coupled to the upper cartridge 220.

Four cell guide units 214 and four cell guide assembly units 224 of the present embodiment are respectively provided in four corner areas of the cartridge 200. However, according to an alternative embodiment of the present disclosure, two cell guide units 214 and two cell guide assembly units 224 may be respectively provided in two of the corner areas of the cartridge 200, which are diagonal with respect to each other. According to the alternative embodiment, the number of the cell guide units 214 and the cell guide assembly units 224, which are configured to guide and fix the stacking of the second batteries 100, may be minimized.

As described above, in the cartridge 200 of the present embodiment, horizontal motion or deviation of the upper cartridge 220 with respect to the lower cartridge 210 may be prevented by the cell guide unit 214 of the lower cartridge 210 and the cell guide assembly unit 224 of the upper cartridge 220. Thus, the lower cartridge 210 may be more easily hook-coupled to the upper cartridge 220.

A battery module according to the present disclosure may include at least one cell cartridge assembly 10 as described above. In addition to the cell cartridge assembly 10, the battery module according to the present disclosure may further include a sensing assembly configured to sense voltage/current characteristics of the cell cartridge assemblies 10, a cooling member configured to manage heat generated by secondary batteries, and various devices configured to control the charging and discharging of the secondary batteries, for example, a battery management system (BMS), a current sensor, and a fuse.

The battery module according to the present disclosure may be applied to vehicles, such as electric vehicles or hybrid vehicles. That is, a vehicle according to the present disclosure may include at least one battery module according to the present disclosure.

As described above, while the present disclosure has been particularly shown and described with reference to exemplary embodiments thereof, it will be understood by those of ordinary skill in the art that it is capable of various changes and modifications without departing from the scope of the present disclosure as defined by the following claims.

INDUSTRIAL APPLICABILITY

The present disclosure relates to a cartridge for a secondary battery and is particularly applicable to industries related to a battery module including the above-described cartridge for the secondary battery and devices (e.g., electric vehicles) driven by the battery module.

What is claimed is:

1. A cartridge for a secondary battery, comprising:
a lower cartridge having a side wall;
an upper cartridge capable of being assembled with the lower cartridge;
at least one secondary battery between the lower cartridge and the upper cartridge;
a cell guide unit extending from the lower cartridge, the cell guide unit having two inner wall surfaces that protrude upward in at least one corner area of the lower cartridge and are adjacent to each other at right angles to each other, a height of the cell guide unit being greater than a height of the lower cartridge side wall; and
a cell guide assembly unit extending from the upper cartridge, the cell guide assembly unit having a shape fit for the cell guide unit;
wherein the cell guide unit has a lower end part and an upper end part, the upper end part having a height greater than the lower end part to create a step from outside to inside of the cell guide unit such that the upper end part of the cell guide unit is thinner than the lower end part of the cell guide unit.

2. The cartridge of claim 1, wherein the lower end part of the cell guide unit has a shape fit for the cell guide assembly unit in a vertical direction, and the upper end part of the cell guide unit is inside the cell guide assembly unit.

3. The cartridge of claim 1, wherein each of the lower cartridge and the upper cartridge has a rectangular shape, and
one cell guide unit is provided in each of four corner areas of the lower cartridge.

4. The cartridge of claim 1, wherein the lower cartridge comprises a lower cooling plate provided in a form of a thermal conductive plate, a first lower frame provided in a form of a rectangular ring having an empty central part and coupled to the lower cooling plate to cover the central part of the first lower frame, and a second lower frame forming a wall body on a long side of the first lower frame, and
wherein the cell guide unit is provided at each of both end parts of the second lower frame.

5. The cartridge of claim 4, wherein the upper cartridge comprises an upper cooling plate provided in a form of a thermal conductive plate, a first upper frame provided in a form of a rectangular ring having an empty central part and coupled to the upper cooling plate to cover the central part of the first upper frame, and a second upper frame forming a wall body on a long side of the first upper frame, and
wherein the second lower frame is formed to have a greater height than the second upper frame.

6. The cartridge of claim 5, wherein at least one hook is provided in a side part of the second upper frame, and at least one hook catch hole is provided in a side part of the second lower frame to correspond to the at least one hook of the second upper frame.

7. The cartridge of claim 5, wherein the lower cooling plate is thermally fused and bonded to an outer surface of the first lower frame, and the upper cooling plate is thermally fused and bonded to an outer surface of the first upper frame.

8. The cartridge of claim 5, wherein at least one of the lower cooling plate and the upper cooling plate comprises a temperature-measuring tab protruding from at least one side of the at least one of the lower cooling plate and the upper cooling plate in a lengthwise direction.

9. A battery module comprising the cartridge for a secondary battery of claim 1.

10. A vehicle comprising the battery module of claim 9.

11. The cartridge of claim 1, wherein the height of the upper end part is equal to a combined height of the lower end part and a height of the cell guide assembly unit.

12. The cartridge of claim 1, wherein a bottom surface of the cell guide assembly unit contacts an upper surface of the lower end part.

13. The cartridge of claim 1, wherein the lower end part has a step in height in a lateral direction.

14. The cartridge of claim 1, wherein the height of the lower end part is greater than a height of the lower cartridge side wall.

* * * * *